L. BADOIS AND D. KAHN.
LOCK SCREW.
APPLICATION FILED JAN. 29, 1921.

1,394,880.

Patented Oct. 25, 1921.

Louis Badois
Dolphy Kahn
Inventors
by Wm. B. Whitney
Attorney

UNITED STATES PATENT OFFICE.

LOUIS BADOIS AND DOLPHY KAHN, OF PARIS, FRANCE.

LOCK-SCREW.

1,394,880.  Specification of Letters Patent.  Patented Oct. 25, 1921.

Application filed January 29, 1921. Serial No. 440,830.

*To all whom it may concern:*

Be it known that we, LOUIS BADOIS and DOLPHY KAHN, of Paris, France, residing at Paris, 212 Boulevard Péreire, have invented Improvements in and Relating to Lock-Screws, of which the following is a specification.

This invention relates to a type of lock nut acting in the same manner as an ordinary nut, the action of which is however, completed by a very strong connection with the piece upon which it is intended to press, thereby preventing any play taking place between the two parts under the action of vibrations.

The invention has been illustrated by way of example in the accompanying drawings, in which—

Figure 1:
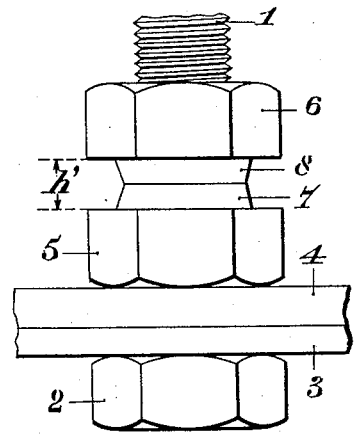
Figure 2:
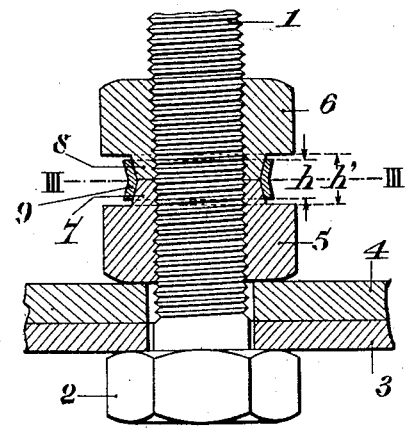
Figure 4:
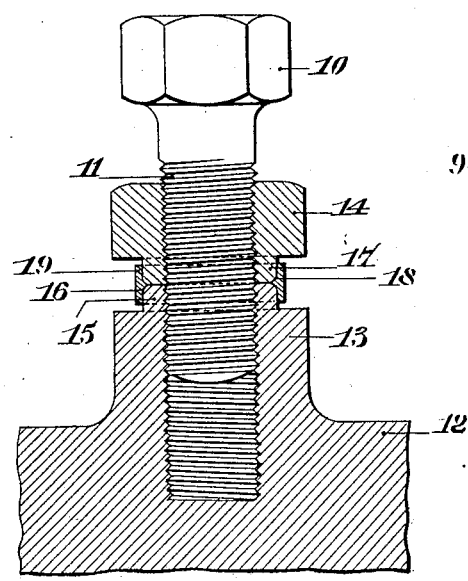
Figure 3:
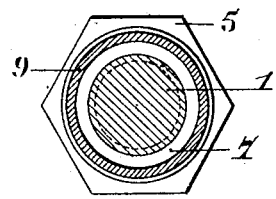

Figure 1 is a front elevational view of the present arrangement when applied to an assemblage by nut and check-nut, the connecting member being supposed removed, Fig. 2 is a sectional elevation of the same arrangement the connecting member being shown in position, Fig. 3 is a section made along the line 3—3 of Fig. 2, Fig. 4 is a sectional elevation showing another application of the arrangement according to the present invention.

In the example illustrated in Figs. 1, 2 and 3 of the drawings we show a screwthreaded rod provided with a head 2 on which the members to be assembled such as 3 and 4 should be pressed by means of a nut 5 held by check-nut 6.

The nut and check-nut are provided, according to the present invention, with a cylindrical or conical part 7—8, which is easily obtained during the manufacture and which it is not necessary to lathe with precision. Indeed, the connecting washer 9 which will be mentioned hereinafter is subjected to a real embossing between the parts 7—8 above mentioned during the pressing together of the whole arrangement.

The said connecting washer 9 forms one of the essential elements of the arrangement according to the present invention and it should in principle be established in such a manner that its inside diameter shall be slightly less than that of the parts intended to receive it, and that its height $h$ shall be slightly lower than the height $h'$ that separates the parts of the nut and check-nut facing each other so that it shall not disturb the ordinary wedging action of the latter to which is added the action of assemblage due to the forcing of the ring upon the parts provided for this purpose.

The said washer may be easily obtained by cutting from a tube of soft steel or any other substance of such a nature that it can be subjected, without deterioration, to an embossing which will slightly alter its shape when it will be subjected to the combined action of the two cylindrical or conical parts 7—8.

It is precisely the said embossing that forms the very strong connection mentioned at the beginning of the present description and which prevents the elements of the device of working separately under the action of vibrations.

In order to loosen the whole arrangement when it is fixed, it is enough to loosen slightly the check-nut while the nut is maintained fixed in order to do away with the locking effect by wedging, then to introduce the nut and check-nut in the same key, in order to rotate them together like an ordinary nut.

The locking of the whole device is obtained by operating in the opposite way to the one which has just been indicated, that is by rotating the check-nut so as to be locked on the nut after the latter has been itself locked upon the member which it should hold in position.

The example illustrated in Fig. 4 of the drawings corresponds to one mode of application of the arrangement according to the present invention in which a head 10 of a screwthreaded rod 11 engaging in a fixed member 12 should be held in an exact position after adjustment.

In the latter case, the part 13 of the member 12 which is placed opposite the nut 14 is lathed in such a manner as to have a cylindrical or conical bearing similar to the bearing 7 of the previous example; in the present case, the said bearing 15 is supposed cylindrical and is ended by a reversed quarter of a circumference 16. The lathed part 17 of the nut 14 is ended at 18 by a similar shape.

It is then possible to use a tightening ring 18 having a cylindrical shape, the action of the two quarters of circumferences 16 and 18 facilitating the embossing of the said ring.

Having now particularly described and ascertained the nature of our said invention and in what manner the same is to be performed, we declare that what we claim is:—

1. An arrangement of lock screw including a cylindrical bearing provided on those parts of the nut and of the threaded piece receiving the screw to be locked in position which are opposite to each other, said bearings being intended to act together with a metallic ring or washer arranged between the said nut and the said threaded piece and having a slightly smaller diameter, in such a manner that the combined action of the said two bearings shall subject it to an embossing altering slightly its shape, whereby a very strong connection between the nut and the threaded piece receiving the screw to be locked in position is insured; the height of the said washer being determined preferably in such a manner as not to hamper the normal action exerted by a check-nut upon a nut.

2. An arrangement of lock screw according to the claim 1, characterized in this that the bearing provided on those parts of the nut and of the threaded piece receiving the screw to be locked in position which are opposite to each other, has a conical shape.

In testimony whereof we have signed our names to this specification in the presence of two subscribing witnesses.

LOUIS BADOIS.
DOLPHY KAHN.

Witnesses:
JULES FAYOLLET,
ANDRÉ BORDILLON.